US006289019B1

United States Patent
Dieudonne

(10) Patent No.: US 6,289,019 B1
(45) Date of Patent: Sep. 11, 2001

(54) DEVICE AND METHOD FOR SWITCHING ATM CELLS TO GROUPS OF CONNECTIONS AND CORRESPONDING INPUT AND OUTPUT TERMINAL FUNCTIONS

(75) Inventor: Marc Dieudonne, Igny (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/128,783

(22) Filed: Aug. 4, 1998

(30) Foreign Application Priority Data

Aug. 7, 1997 (FR) .................................................. 97 10129

(51) Int. Cl.[7] .................................................. H04L 12/56
(52) U.S. Cl. .............................................................. 370/395
(58) Field of Search ................................ 370/351, 352, 370/395, 389, 229, 230, 231, 390, 413, 252, 254, 255, 406, 396, 411, 412, 370, 369, 372, 468; 340/825.5, 825.51, 825.01, 825.8, 825.79

(56) References Cited

U.S. PATENT DOCUMENTS

| 5,555,256 | * | 9/1996 | Calamvokis et al. | ................. | 370/399 |
| 5,592,476 | * | 1/1997 | Calamvokis et al. | ................. | 370/390 |
| 6,111,858 | * | 8/2000 | Greaves et al. | ....................... | 370/256 |

FOREIGN PATENT DOCUMENTS

| 0 446 492 A1 | 9/1991 | (EP) . |
| 0 524 350 A1 | 1/1993 | (EP) . |
| 2 288 297 A | 10/1995 | (GB) . |
| WO 93/19550 | 9/1993 | (WO) . |

OTHER PUBLICATIONS

N. Yamanaka et al, "Performance Evaluation of an ATM Connection with Several Cell Flow Compenents", IEICE Transactions on Communications, vol. E79–B, No. 5, May 1, 1996, pp. 716–718.

Wen–Tsuen Chen et al, "A Feasible Framework of Traffic Control on an ATM Wide–Area Network", Computer Networks and ISDN Systems, vol. 27, No. 1, Oct. 1994, pp. 67–83.

* cited by examiner

*Primary Examiner*—Dang Ton
(74) *Attorney, Agent, or Firm*—Sughrue, Mion, Zinn, Macpeak & Seas, PLLC

(57) ABSTRACT

An ATM cell switching device comprises a switching arrangement means interconnecting a plurality of input terminal functions with a plurality of output terminal functions and creates groups of connections, all the connections of a group of connections coming from the same input terminal function and going to at least one common output terminal function. Each of the connection cells of a group of connections is assigned the same connection group identifier for routing cells in the switching arrangement. Each of the input terminal functions and the output terminal functions comprises, for each of the groups of connections, a spacing arrangement for re-establishing the nominal period of the cells of each of the connections or establishing a global period for all of the group.

11 Claims, 2 Drawing Sheets

DEVICE AND METHOD FOR SWITCHING ATM CELLS TO GROUPS OF CONNECTIONS AND CORRESPONDING INPUT AND OUTPUT TERMINAL FUNCTIONS

BACKGROUND OF THE INVENTION

1. Field of the Invention

The field of the invention is that of digital data transmission. To be more precise, the invention concerns the switching of ATM (Asynchronous Transfer Mode) cells between a plurality of incoming channels and a plurality of outgoing channels.

2. Description of the Prior Art

The general principle of ATM transfer is well known and many switching techniques and architectures have been described. Conventionally, an ATM switching node comprises:

- an input stage comprising a plurality of input terminal functions each receiving call data (cells) on a plurality of incoming channels,
- one or more switching stages formed of switching matrices, and
- an output stage comprising a plurality of output terminal functions each distributing cells to a plurality of outgoing channels,
- the whole being organized so that any cell received on any incoming channel can be directed to any outgoing channel.

Switching, i.e. transfer or routing of cells to the required outgoing channel, is usually controlled on a "by connection" basis. In other terms, a transfer path in the switching stages is defined and marked for each connection. A marker at each connection point indicates the path to be taken by each cell identified by its connection data.

This connection data is conventionally the virtual path (VP) and/or the virtual circuit (VC). Other routing information can equally be used for ATM connections internal to the switching devices.

Marking control utilizes relatively complex operations on each new connection and each disconnection. A new connection presupposes a search for an available path to the required outgoing channel and then marking each intersection of the identified path with information (VP/VC) enabling the source and the destination of each cell to be recognized. It also presupposes the presence of high-capacity memory means at each intersection for associating the routing data with each connection. Also, current standards distinguish a plurality of ATM transfer capabilities (ATC) and a plurality of qualities of service (QoS). In their "traffic contract" users can choose the "ATC" and the "QoS" they want.

At present day switching nodes this variety leads to the use of dedicated means. To be more precise:

- the various "ATC & QoS" traffics are separated and switched in different planes,
- the various "ATC & QoS" traffics are separated and switched in different buffers in each switching stage, or
- internal protocols are used between internal switching points, based on different algorithms and parameters.

Clearly these various solutions are complex in terms of both hardware and software. They are therefore costly in terms of processing time, memory capacity, etc.

Document U.S. Pat. No. 5,309,430 describes an ATM cell switching device comprising switching means interconnecting a plurality of input terminal functions with a plurality of output terminal functions and comprising means for creating groups of connections; all the connections of one group of connections coming from the same input terminal function and going to at least one common output terminal function, each of the cells of the connections of one group of connections being allocated the same connection group identifier for routing cells in said switching means.

This ATM switching process limits the number of operations to be effected when setting up a connection, in particular with regard to marking the path inside the switching network. It reduces the amount of memory required, in particular in the switching stages. Groups of connections (GoC) are defined so that a plurality of separate connections are treated in the same way in the switching means when they must be directed to the same output terminal function or functions. In this way marking in the switching stages is greatly simplified and established once and for all when the "GoC" is established.

The objective of the invention is to propose a process and a device optimizing cell delivery speed and timing approximating the nominal period of the cells.

Another objective of the invention is to simplify the specific processing operations imposed by the various "ATC" and "QoS".

SUMMARY OF THE INVENTION

The above objectives, and others that will become more clearly apparent hereinafter, are achieved by means of an ATM cell switching device of the type comprising switching means interconnecting a plurality of input terminal functions with a plurality of output terminal functions and means for creating groups of connections, all the connections of a group of connections coming from the same input terminal function and going to at least one common output terminal function, each of the connection cells of a group of connections being assigned the same connection group identifier for routing cells in said switching means, wherein each of said input terminal functions and said output terminal functions comprises, for each of said groups of connections, spacing means for re-establishing the nominal period of the cells of each of said connections or establishing a global period for all of the group.

These spacing means, known in themselves, but conventionally applied to each connection, are here much more effective because of the large number of cells covered by each group of connections.

Said connections preferably correspond to internal ATM connections and/or to external ATM connections characterized by a virtual path (VP) and/or a virtual circuit (VC).

Said means for creating connection groups advantageously allocate to each connection group a bandwidth greater than the bandwidth strictly necessary to said connection group when it is created. This simplifies the handling of a new connection, and even renders it transparent. In other words, said means for creating connection groups comprise means for marking the path and/or for reserving a necessary bandwidth in said switching means, implemented once for each connection group when the latter is created, and a new connection can be added at any time to a connection group without path marking or reservation of specific bandwidth.

In one preferred embodiment of the invention each of said input terminal functions comprises means for creating groups of connections and means for allocating to each cell it receives a connection group identifier, and each of said output terminal functions comprises means for processing received cells of a group of connections to associate with each cell information necessary for its further routing.

Accordingly, "GoC" management is transparent for the switching means. The latter act only on identifiers of groups of connections (IGoC).

Said means for creating connection groups preferably group together in a connection group connections having the same quality of service (QoS) and/or the same ATM transfer capability (ATC).

Once again the fact that the number of "GoC" is small compared to the number of connections optimizes the handling of the various parameters.

The invention also concerns the switching process employed in particular by a device as described hereinabove. A process of the above kind creates groups of connections, all the connections of a group of connections coming from the same input terminal function and going to at least one common output terminal function, each of the cells of the connections of a group of connections being allocated the same connection group identifier for routing cells in said switching means.

The above process advantageously comprises the following steps:
in each of said input terminal functions:
creating connection groups,
assigning to each cell received a connection group identifier,
in each of said output terminal functions processing received cells of a group of connections to associate with each cell information necessary for its further routing,
and further consists in, for each of said connection groups, spacing the cells to re-establish the nominal period of the cells of each of said connections or establishing a global period for all of the group.

The process preferably comprises a step of path marking and/or reservation of a necessary bandwidth in said switching means implemented once only for each connection group when the latter is created so that a new connection can be added at any time to a connection group without path marking or reservation of specific bandwidth.

The invention also concerns the input and output terminal functions of an ATM switching device comprising the elements necessary for implementing the invention.

Accordingly, an input terminal function includes means for creating groups of connections, all of the connections of a group of connections coming from the same input terminal function and going to at least one common output terminal function, each of the connection cells of a group of connections being allocated the same connection group identifier for the purpose of routing cells in said switching means, said function comprising, for each of said connection groups, spacing means for re-establishing the nominal period of the cells of each of said connections or establishing a global period for all of the group.

An output terminal function includes means for processing received cells of a group of connections to associate with each cell information necessary for its further routing, said function comprising, for each of said connection groups, spacing means for re-establishing the nominal period of the cells of each of said connections or establishing a global period for all of the group.

Other features and advantages of the invention will become more clearly apparent upon reading the following description of one preferred embodiment given by way of illustrative and non-limiting example only and from the accompanying drawings.

DETAILED DESCRIPTION OF THE PREFERRED EMBODIMENT

Figure 1:
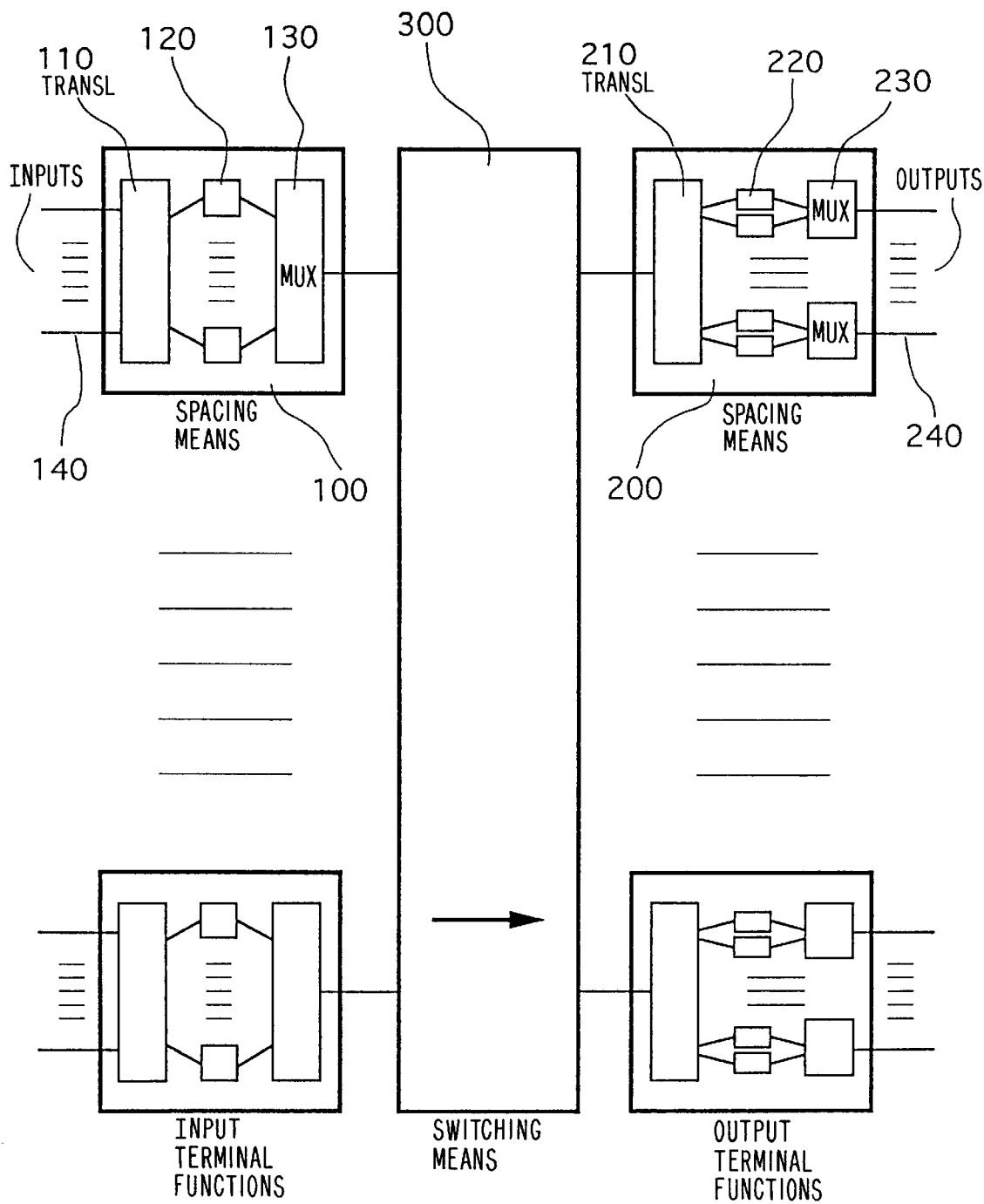
FIG. 1 shows the theory of operation of a device in accordance with the invention.

As already indicated, the invention is based on the use of groups of connections in an ATM switching network. Broadly speaking, a connection group can be considered as a "pipe" defined in the switching network between an input terminal function and one or more output terminal functions. This "pipe" is uniquely defined by a marker in the switching network.

A group of connections (GoC) can correspond to a set of internal or external ATM connections. It is characterized by:
its end points (input terminal function and output terminal function),
the set of connections that it comprises, characterized for example by the "VCC" and/or "VPC" or by its ATM internal connection references, as well as by its quality of service (QoS) characteristics and its ATM transfer capability (ATC), and
its routing mode: single-path, multi-path, and the corresponding path selection techniques.

To put the invention into effect it is therefore necessary to define a new level of cell identification used on the one hand in the internal links of the ATM node, between the terminal functions, and on the other hand in constructing links of external communication networks, where the multiplexing takes place, for sharing virtual paths.

This new identification level necessitates:
in the input terminal function: translation of incoming virtual circuit and virtual path identifiers into an internal group of connections identifier:
VCI-in VPI-in→IGoCI,
in the output terminal function:
IGoCI→VCI-out, VPI-out translation to terminate the internal GoC, and
a VCI-out, VPI-out→external GoC identifier (EGoCI) translation function for sharing traffic on external links.

Of course, the invention can be used only on internal links or only on external links.

In accordance with the invention, in the input stage of the ATM switch, an internal GoC identifier (IGoCI) is therefore added to the connection header. This IGoCI is used as a connection identifier:
in spacing means, before being introduced into the switching means proper, and
in each switching stage of the switching means.

This technique has the particular advantage that the incoming traffic of any connection is spaced by spacing means, which enables the nominal period of the cells to be re-established. This optimizes the use of matrix resources. The spacing, effected either on the basis of the internal GoC or individually on a by connection basis, means that the traffic can be treated as deterministic bit rate (DBR) traffic defined by a peak cell rate (PCR).

In this case small buffers can be used at all switching stages.

Also, the spacing of a group of internal connections is easier to effect because the spacing rate is low and close to the average cell rate. The ratio of the average cell rate to the standard deviation increases with the number of connections.

At switching level, a set of individual connections is replaced by a single ATM "pipe". Consequently, the number of individual connections to be switched becomes independent of the switching capability of the ATM node. In effect, the latter "sees" only the groups of connections.

In the event of an internal failure fast internal rerouting is possible because only the group of connections has to be rerouted, rather than a set of individual connections.

Also, the internal traffic contract can be set globally for all the connections belonging to a group of connections rather than connection by connection. This optimizes the reaction time of the traffic control function. For example, in an input terminal function (TU) only 512 internal connection groups per ATC have to be managed, in the wide configuration, whereas the conventional techniques have to handle up to 64000 connections.

FIG. 1 shows the functional architecture of a device in accordance with the invention. This device comprises switching means 300 that are conventional in themselves but are adapted to transfer groups of connections. The connection means 300 interconnect a plurality of input terminal functions 100 and a plurality of output terminal functions 200.

Each input terminal function is fed by a plurality of VP/VC inputs 140. Translator means 110 add an internal group of connections identifier (IGoCI) to the header of each cell.

A set of spacing means 120 spaces the cells for each internal connection group in order to regularize the throughput of cells of each connection to deliver these cells at a rate close to their nominal rate or with a global period for the whole of the group. The spacing means deliver the cells to cell multiplexing means 130 on one or more links of the switching means 300.

Symmetrically to this, the cells are received in the output terminal functions 200 in the translator means 210 which translate the internal group identifier on the one hand into virtual path and virtual circuit identifiers (VPI and VCI) and on the other hand into an external connection group identifier.

Spacing means 220 homogenize the throughput for each external GoC by re-establishing the nominal period of the cells of each of said connections or by establishing a global period for all of the group. They feed respective multiplexing means 230 or deliver the corresponding flows to the external connection group on the output ATM links 240.

N internal connection groups are advantageously defined between each input terminal function and each output terminal function, N being equal to the number of internal ATM transfer capabilities (ATC) required to handle all the available ATC and QoS. These N internal connection groups can be created logically at system initialization time.

The routing of a group of internal connections can be defined in the form of one or more physical paths with the possibility of a real time choice when the connection is initialized, for example in accordance with the call admission command (CAC) and/or the internal blocking control mechanism.

Figure 2:
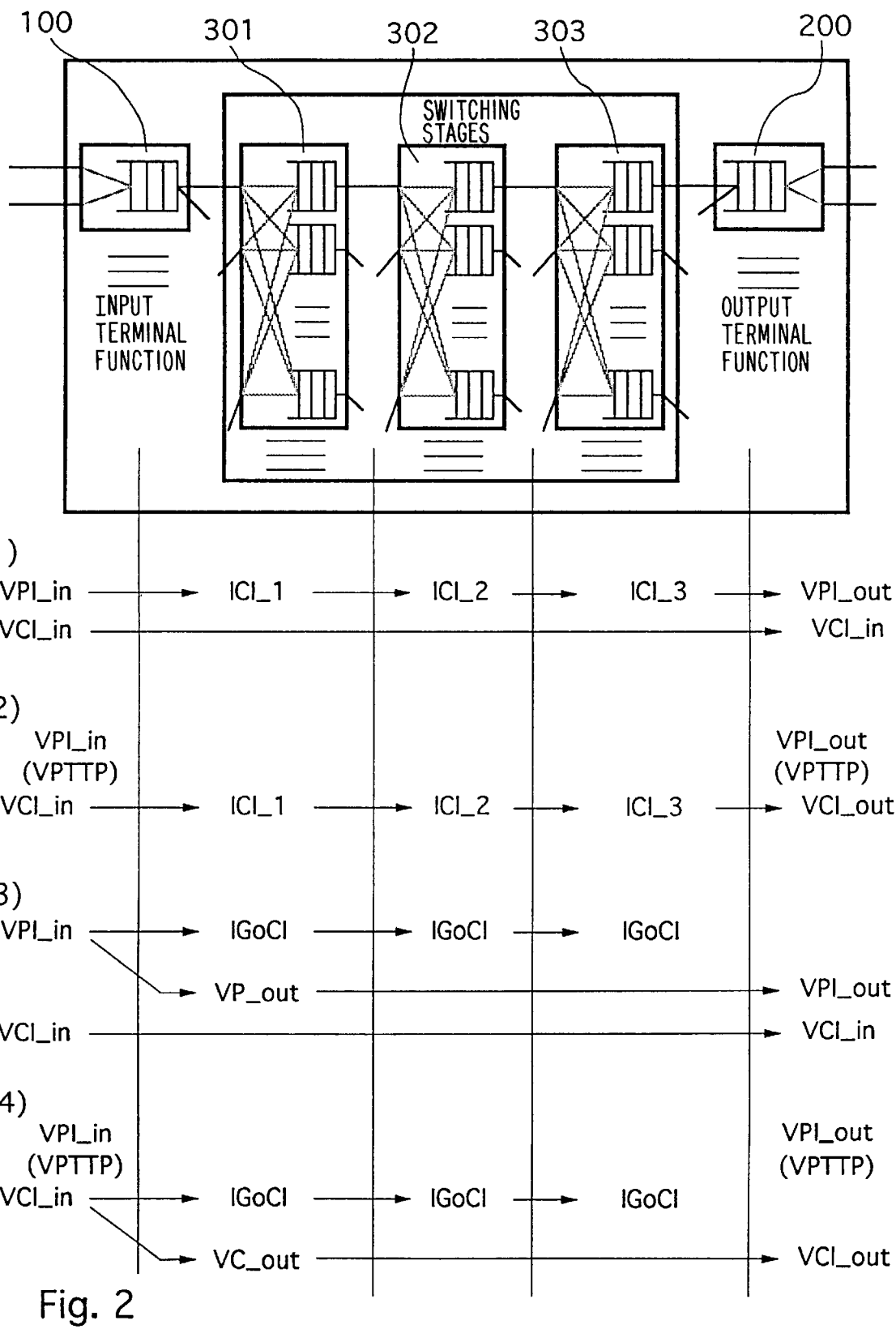
FIG. 2 shows the translations effected to transfer cells in a switching device, on the one hand in accordance with the prior art ("VP" or "VC") and on the other hand in accordance with the invention.

FIG. 2 shows one example of the invention in the case of a device with three virtual circuit transfer unit switching stages 301, 302 and 303 for which the VPI field is used to transmit the internal connection group identifier.

The diagram shows four situations, the first two corresponding to the prior art and the last two to the present invention:

1) Conventional transmission by VPC: the VPI-in is translated at each switching stage 301 through 303 into an internal connection identifier ICI-1, ICI-2 and then ICI-3 and then into VPI-out in the output stage. The VCI-in is transmitted transparently without modification.

2) Conventional transmission by VCC: the VCI-in is translated at each switching stage 301 through 303 into an internal connection identifier ICI-1, ICI-2 and then ICI-3, and then into VCI-out in the output stage. The VPI-in is transformed into VPI-out (VPTTP technique).

3) Transmission by VPC in accordance with the invention: the VPI-in is translated for all of the switching stages 301 through 303 into a single internal group of connections identifier IGoCI. A VP-out is transmitted in parallel to give the VPI-out in the output stage. The VCI-in is transmitted transparently without modification.

4) Transmission by VCC in accordance with the invention: the VCI-in is translated for all of the switching stages 301 through 303 into a single internal group of connections identifier IGoCI. A VC-out is transmitted in parallel to give the VCI-out in the output stage. The VPI-in is converted into VPI-out (VPTTP technique).

What is claimed is:

1. An ATM cell switching device comprising a plurality of input terminal functions;

a plurality of output terminal functions;

switching means interconnecting said input terminal functions with said output terminal functions; and means for creating a plurality of groups of connections, wherein all of the connections of each group of connections originate from one common input terminal function and go to at least one common output terminal function, and all cells of each group of connections are assigned a common connection group identifier for routing the cells in said switching means, wherein each of said input terminal functions and said output terminal functions comprises, for each of said groups of connections, spacing means for re-establishing a nominal delivery period of the cells of each of said connections or establishing a global delivery period for all of the cells of each group of connections.

2. The switching device claimed in claim 1, wherein said connections correspond to internal ATM connections or to external ATM connections characterized by a virtual path or a virtual circuit.

3. The switching device claimed in claim 1, wherein said means for creating groups of connections allocate to each group of connections a bandwidth which is greater than a bandwidth necessary to each group of connections when created.

4. The switching device claimed in claim 1, wherein said means for creating groups of connections comprise means for marking a path or for reserving a necessary bandwidth in said switching means, implemented once for each group of connections when each group of connections is created, and a new connection can be added at any time to each group of connections without path marking or reservation of specific bandwidth.

5. The switching device claimed in claim 1, wherein each of said input terminal functions comprises means for creating groups of connections and means for allocating to each received cell a connection group identifier and each of said output terminal functions comprises means for processing received cells of a group of connections to associate with each cell information necessary for further routing.

6. The switching device claimed in claim 1, wherein a connection group comprises connections having a same quality of service or the same ATM transfer capability.

7. A method for switching ATM cells between a plurality of input terminal functions and a plurality of output terminal functions by means of switching means, the method comprising:
- creating connection groups, wherein all of the connections of each connection group originate from a same input terminal function and go to at least one common output terminal function, and cells of each connection group are allocated a common connection group identifier for routing the cells in said switching means; and
- spacing the cells, for each of said connection groups, to re-establish a nominal delivery period of the cells of each of said connections or establishing a global delivery period for all cells of each connection group.

8. A switching method as claimed in claim 7, further comprising the following steps:
- in each of said input terminal functions:
  - creating connection groups,
  - assigning to each cell received a connection group identifier,
- in each of said output terminal functions, processing received cells of a group of connections to associate with each cell information necessary for further routing.

9. A switching process as claimed in claim 7, further comprising a step of path marking or reservation of a necessary bandwith in said switching means implemented once only for each connection group when each connection group is created and wherein a new connection can be added at any time to each connection group without path marking or reservation of specific bandwidth.

10. An input terminal function of an ATM cell switching device including switching means for interconnecting the input terminal function with a plurality of output terminal functions, said input terminal function comprising:
- means for creating groups of connections, wherein all of the connections of each group of connections originate from the input terminal function and go to at least one common output terminal function, and cells of a group of connections are allocated the same connection group identifier for routing cells in said switching means; and
- spacing means for spacing the cells, for each of said connection groups, to re-establish a nominal delivery period of the cells of each of said connections or establish a global delivery period for all cells of each of said connections of the group.

11. An output terminal function of an ATM cell switching device, said switching device switching means interconnecting a plurality of input terminal functions with a plurality of output terminal functions and means for creating groups of connections, wherein all of the connections of each group of connections originate from the same input terminal function and go to at least one common output terminal function and cells of a group of connections are allocated the same connection group identifier for routing cells in said switching means, said output terminal comprising:
- means for processing cells received from a group of connections to associate with each cell information necessary for further routing; and
- spacing means for spacing the cells to re-establish a nominal delivery period of the cells of each of said connections or establish a global delivery period for all cells of each of said connections of the group.

* * * * *